(12) United States Patent
Cheng (10) Patent No.: US 12,407,532 B2
(45) Date of Patent: Sep. 2, 2025

(54) GAIN CELL MEMORY BASED PHYSICALLY UNCLONABLE FUNCTION

(71) Applicant: INTERNATIONAL BUSINESS MACHINES CORPORATION, Armonk, NY (US)

(72) Inventor: Kangguo Cheng, Schenectady, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 484 days.

(21) Appl. No.: 16/793,092

(22) Filed: Feb. 18, 2020

(65) Prior Publication Data

US 2021/0258173 A1    Aug. 19, 2021

(51) Int. Cl.
*H04L 9/32* (2006.01)
*G11C 7/06* (2006.01)
*H04L 9/08* (2006.01)

(52) U.S. Cl.
CPC .............. *H04L 9/3278* (2013.01); *G11C 7/06* (2013.01); *H04L 9/0869* (2013.01)

(58) Field of Classification Search
CPC ........ H04L 9/3278; H04L 9/0869; G11C 7/06
See application file for complete search history.

(56) References Cited

U.S. PATENT DOCUMENTS

| 8,590,010 | B2 | 11/2013 | Fainstein et al. | |
|---|---|---|---|---|
| 9,202,040 | B2 | 12/2015 | Rosenblatt et al. | |
| 9,208,355 | B1* | 12/2015 | Areno | H04L 9/0866 |
| 9,425,803 | B1 | 8/2016 | Duncan et al. | |
| 9,947,391 | B1* | 4/2018 | Mahatme | G11C 7/24 |
| 10,078,462 | B2 | 9/2018 | Wang et al. | |
| 10,224,083 | B2 | 3/2019 | Saito | |
| 10,424,380 | B1* | 9/2019 | Li | G11C 14/0081 |
| 10,764,069 | B1* | 9/2020 | Hurwitz | H04L 9/0866 |
| 10,803,942 | B1* | 10/2020 | Jung | H04L 9/3278 |
| 2002/0024835 | A1* | 2/2002 | Thompson | G11C 11/22 365/117 |
| 2003/0137865 | A1* | 7/2003 | Thompson | G11C 7/06 365/145 |
| 2014/0005967 | A1 | 1/2014 | Fu et al. | |
| 2014/0093074 | A1* | 4/2014 | Gotze | G06F 21/73 380/45 |

(Continued)

OTHER PUBLICATIONS

Giterman et al. "Gain-Cell Embedded DRAM-Based Physical Unclonable Function", IEEE Transactions on Circuits and Systems I: Regular Papers, Jun. 21, 2018, pp. 4208-4218, vol. 65, Issue: 12.

(Continued)

*Primary Examiner* — Phy Anh T Vu
(74) *Attorney, Agent, or Firm* — Tutunjian & Bitetto, P.C.; Kimberly Zillig (57) ABSTRACT

A method is presented for employing a physically unclonable function (PUF) structure for chip authentication. The method includes connecting a plurality of gain cells to either a first multiplexer or a second multiplexer and receiving outputs from the first and second multiplexers by a current sense amplifier. The plurality of gain cells can be either two-transistor gain cell memories or three-transistor gain cell memories.

20 Claims, 5 Drawing Sheets

(56) References Cited

U.S. PATENT DOCUMENTS

| | | | | |
|---|---|---|---|---|
| 2014/0269025 | A1* | 9/2014 | Seningen | G11C 7/06 365/154 |
| 2016/0148666 | A1* | 5/2016 | Rosenberg | G09C 1/00 365/158 |
| 2017/0301406 | A1* | 10/2017 | Wong | G11C 16/14 |
| 2017/0302271 | A1* | 10/2017 | Kato | H03K 17/6871 |
| 2018/0013431 | A1* | 1/2018 | Bury | H04L 9/0861 |
| 2018/0102163 | A1* | 4/2018 | Lin | G11C 11/418 |
| 2018/0131527 | A1* | 5/2018 | Lu | G09C 1/00 |
| 2019/0026724 | A1* | 1/2019 | Wade | H04L 9/3278 |
| 2019/0028283 | A1* | 1/2019 | Sharifi | G06F 21/86 |
| 2019/0068190 | A1* | 2/2019 | Karpinskyy | H01L 23/576 |
| 2019/0074984 | A1* | 3/2019 | Shor | G09C 1/00 |
| 2019/0132137 | A1* | 5/2019 | Zhong | H04L 9/3278 |
| 2019/0140643 | A1* | 5/2019 | Kuenemund | H04L 9/0866 |
| 2019/0147948 | A1* | 5/2019 | Cheng | G11C 16/26 257/288 |
| 2019/0155999 | A1 | 5/2019 | Chellappa et al. | |
| 2019/0158299 | A1* | 5/2019 | Poo | H04L 9/0861 |
| 2019/0165938 | A1* | 5/2019 | Lu | B25J 9/1692 |
| 2019/0214556 | A1 | 7/2019 | Chen et al. | |
| 2019/0319810 | A1* | 10/2019 | Lu | G11C 11/417 |
| 2019/0354672 | A1* | 11/2019 | Cambou | G06F 21/45 |
| 2019/0384915 | A1* | 12/2019 | Hars | H04L 9/3278 |
| 2020/0007350 | A1* | 1/2020 | Shifman | G11C 11/417 |
| 2020/0014547 | A1* | 1/2020 | Lu | H03K 3/84 |
| 2020/0091917 | A1* | 3/2020 | Hao | H03L 1/023 |
| 2021/0027814 | A1* | 1/2021 | Mahatme | H04L 9/0866 |
| 2021/0098059 | A1* | 4/2021 | Ong | G06F 3/0673 |
| 2021/0152349 | A1* | 5/2021 | Van Der Sluis | H04L 9/08 |
| 2021/0184870 | A1* | 6/2021 | Hurwitz | G06F 21/73 |
| 2021/0194707 | A1* | 6/2021 | Aronson | H04L 9/0861 |
| 2021/0243041 | A1* | 8/2021 | Schat | H03K 3/037 |
| 2021/0250187 | A1* | 8/2021 | Lu | H04L 9/3278 |

OTHER PUBLICATIONS

Wikipedia. "Physical unclonable function", retrieved from web https://web.archive.org/web/20200213043230/http://en.wikipedia.org/wiki/Physical_unclonable_function, Feb. 13, 2020, 7 pages.

* cited by examiner

GAIN CELL MEMORY BASED PHYSICALLY UNCLONABLE FUNCTION

BACKGROUND

The present invention relates generally to chip authentication, and more specifically, to a gain cell memory based physically unclonable function (PUF).

There is an increasing need to be able to authenticate items, for example electronic devices, official documents, credit cards, mobile communication devices, etc. The need for authentication can rise from different interests, such as detecting forgeries and copies or control of usage of items. There is a variety of item authentication technologies available for use depending on the item. One of these techniques is the Physical Unclonable Function (PUF) that is embodied in the physical structure of the item. If a physical stimulus is applied to the PUF, the PUF reacts in an unpredictable and repeatable way to that stimulus depending on the structure. Previous PUFs have been often found complicated to implement or they have presented security risks, such as offering a backdoor to the device being authenticated. The present invention mitigates the issues of PUFs for chip authentication.

SUMMARY

In accordance with an embodiment, a physically unclonable function (PUF) structure is provided. The PUF structure includes a plurality of gain cells connected to both a first multiplexer and a second multiplexer, and a current sense amplifier receiving outputs of the first and second multiplexers.

In accordance with another embodiment, a method is provided for forming a physically unclonable function (PUF) structure. The method includes connecting a plurality of gain cells to either a first multiplexer or a second multiplexer and receiving outputs from the first and second multiplexers by a current sense amplifier.

In accordance with yet another embodiment, a method is provided for forming a physically unclonable function (PUF) structure. The method includes connecting a plurality of gain cells to either a first multiplexer or a second multiplexer, wherein each of the plurality of gain cells is a three-transistor gain cell memory, receiving outputs from the first and second multiplexers by a current sense amplifier, and using a challenge as a seed for a pseudo-random number generator to generate m pseudo-random numbers as inputs to the PUF structure.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for forming a physically unclonable function (PUF) by employing gain cells. PUFs enable access to their stored random information using a challenge-response-pair (CRP) mechanism, whereby a server or adversary 'asks a question' usually in the form of a digital bit string and the PUF produces a digital response after measuring a set of circuit parameters within the chip. The nanometer size of the integrated circuit (IC) features and the analog nature of stored information makes it extremely difficult to read out the information using alternative access mechanisms. The circuit parameters that are measured vary from one copy of the chip to another, and can only be controlled to a small, but non-zero, level of tolerance by the chip manufacturer. This feature of the PUF makes it unclonable and provides each copy of the chip with a distinct 'personality,' in the spirit of fingerprints or DNA for biological systems.

Therefore, PUF is a physical object that for a given input and conditions (challenge), provides a physically-defined "digital fingerprint" output (response) that serves as a unique identifier, most often for a semiconductor device. PUFs are most often based on unique physical variations which occur naturally during semiconductor manufacturing. One type of PUF is based on a ring-oscillator (RO). Due to intrinsic transistor variation, the frequency of multiple ROs can differ even when the ROs are manufactured by the same processes and on the same chip. However, each RO usually needs hundreds of transistors and can consume relatively large amounts of power.

Embodiments in accordance with the present invention provide methods and devices for alleviating such issues presented by RO PUFs by instead employing gain cells as the PUF. The retention times of gain cells are usually short and vary from cell to cell, thus rendering the PUF unsuitable for conventional memory applications. However, the exemplary embodiments of the present invention take advantage of this drawback (short and varying retention time) of gain cells and employ such gain cells as PUFs.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
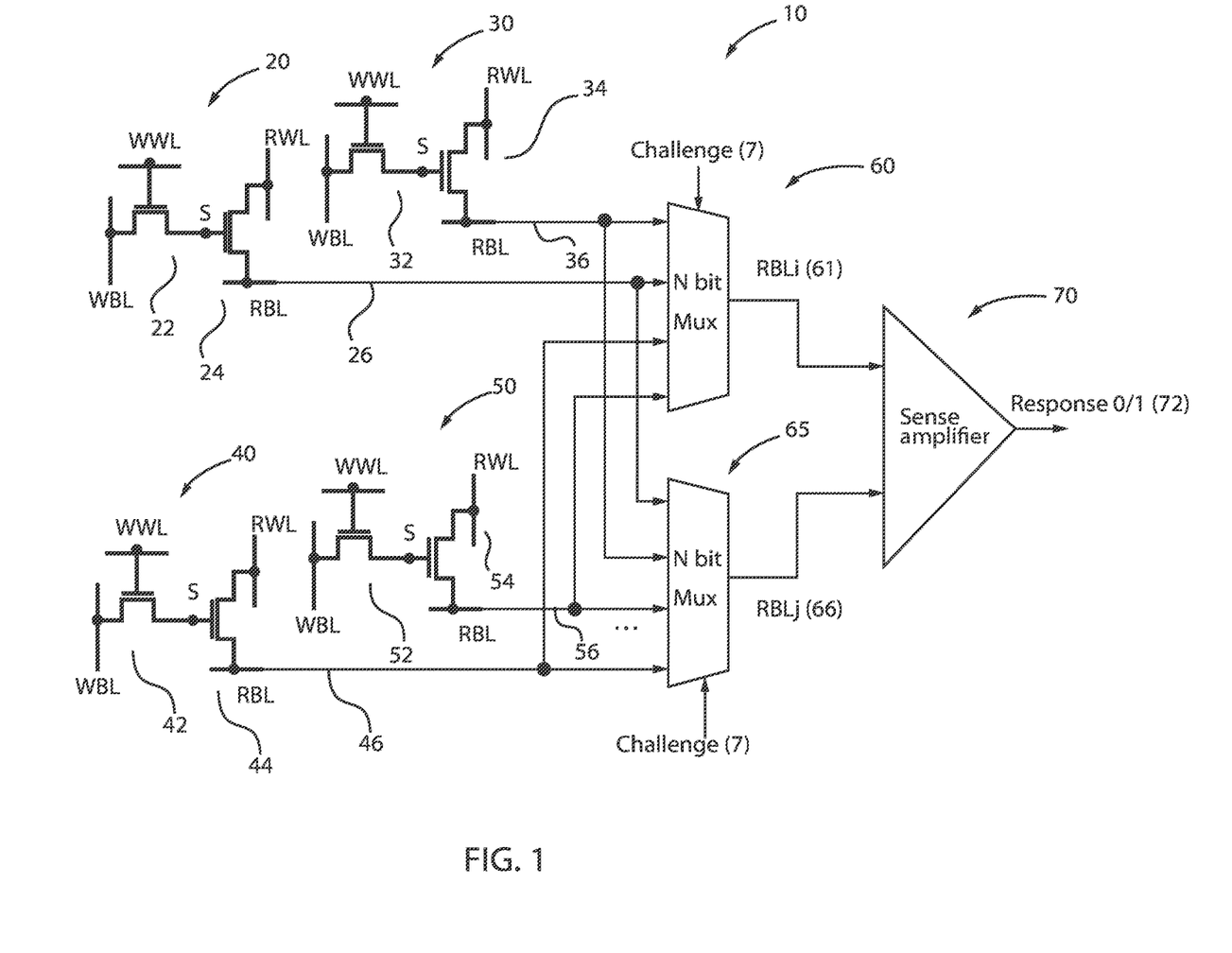
FIG. 1 is an exemplary structure for forming a physically unclonable function (PUF) by employing two-transistor gain cells, in accordance with embodiments of the present invention.

FIG. 1 is an exemplary structure for forming a physically unclonable function (PUF) by employing two-transistor gain cells, in accordance with embodiments of the present invention.

A 2-transistor (2T) gain cell memory includes two transistors (FET1 and FET2) that are used to form the 2T gain cell. The drain of FET1 connects to the gate of FET2. The gate capacitor of FET2 functions as the storage capacitor. To write logic "1," the write wordline (WL) of FET1 is turned on, and a voltage (Vdd) is applied to the write bitline (BL) to charge the gate capacitor of FET2. To write logic "0," the write wordline (WL) of FET1 is turned on, and the write bitline (BL) is grounded to discharge the gate capacitor of FET2. In a standby mode (Hold mode), both Read WL and Read BL are at the same potential (e.g., Vdd). To read, the Read WL is biased at 0V and the Read BL is pre-charged at Vdd. If the storage node is "1," FET2 is ON, and the Read BL is discharged. If the storage node is "0," FET2 is OFF, and the Read BL voltage remains unchanged.

The gain cell PUF 10 depicts a first gain cell 20 and a second gain cell 30 connected to both a first analog multiplexer 60 and a second analog multiplexer 65. Thus, a pair of gain cells 20, 30 are connected to both the first and second multiplexers 60, 65. The gain PUF 10 further depicts a third gain cell 40 and a fourth gain cell 50 connected to both the first and second analog multiplexers 60, 65. Thus, a pair of gain cells 40, 50 are connected to the first and second multiplexers 60, 65. As a result, a group of gain cells 20, 30, 40, 50 is connected to two analog multiplexers 60, 65. The outputs of the multiplexers 60, 65 are provided to a sense amplifier 70, which can be, e.g., a current sense amplifier (SA).

The first gain cell 20 includes a first transistor 22 and a second transistor 24. The read bit line (RBL) 26 is connected to the first multiplexer 60.

The second gain cell 30 includes a first transistor 32 and a second transistor 34. The read bit line (RBL) 36 is connected to the first multiplexer 60.

The third gain cell 40 includes a first transistor 42 and a second transistor 44. The read bit line (RBL) 46 is connected to the second multiplexer 65.

The fourth gain cell 50 includes a first transistor 52 and a second transistor 54. The read bit line (RBL) 56 is connected to the second multiplexer 65.

The connection order of the gain cells to the input ports of each multiplexer can be different. For example, first multiplexer 60, from top to bottom, has input ports connections 30, 20, 40, 50. In contrast, the second multiplexer 65, from top to bottom, has input port connections 20, 30, 50, 40. Thus, the gain cells 20, 30, 40, 50 can be connected to each multiplexer 60, 65 in a different order. The output of each multiplexer 60, 65 depends on which port is selected. With such a configuration, when a same challenge 7 is applied to both multiplexers 60, 65, the output of each multiplexer will be different because of the different orders of connections of the gain cells 20, 30, 40, 50 to the input ports of the first and second multiplexers 60, 65.

As a result, paired gain cell groups are employed to simplify the process for reading out the PUF data. The exemplary embodiments of the present invention do not need the precise reading of each PUF cell. Instead, the relative retention times of a group of gain cells (e.g., pairs of gain cells) are used for reading the PUF data. In other words, the sensing mechanism involves using retention times of gain cells. The exemplary embodiments of the present invention thus employ gain cell memory to form the PUFs.

Due to the inherent manufacturing variation, the retention time of gain cells 20, 30, 40, 50 varies.

The signals of each pair of read bitlines (e.g., RBLi and RBLj) are compared by the current sense amplifier 70. If current (RBLi 61) is greater than the current (RBLj 66), then the current SA 70 outputs a logic "1". Otherwise, the current SA 70 outputs a logic "0." The output is designated as 72.

First, all gain cells 20, 30, 40, 50 are charged by turning both write wordline (WWL) and write bitline (WBL) to High. Then both WWL and WBL are turned off (Low). The read wordline (RWL) is then turned to High. Then wait for a given time period (e.g., 1 micron second).

A same challenge 7 is applied to both multiplexers 60, 65 as "Select" input to select a pair of gain cells. Due to the inherent variation of retention time of the gain cells, the electrical currents of the selected pair of read bitlines (e.g., RBLi and RBLi) are different. The currents are compared by the current SA 70.

If the current (RBLi 61) is greater than the current (RBLj 66), then the SA 70 outputs a logic "1." Otherwise, the SA 70 outputs a logic "0." This output is designated as 72.

Figure 5:
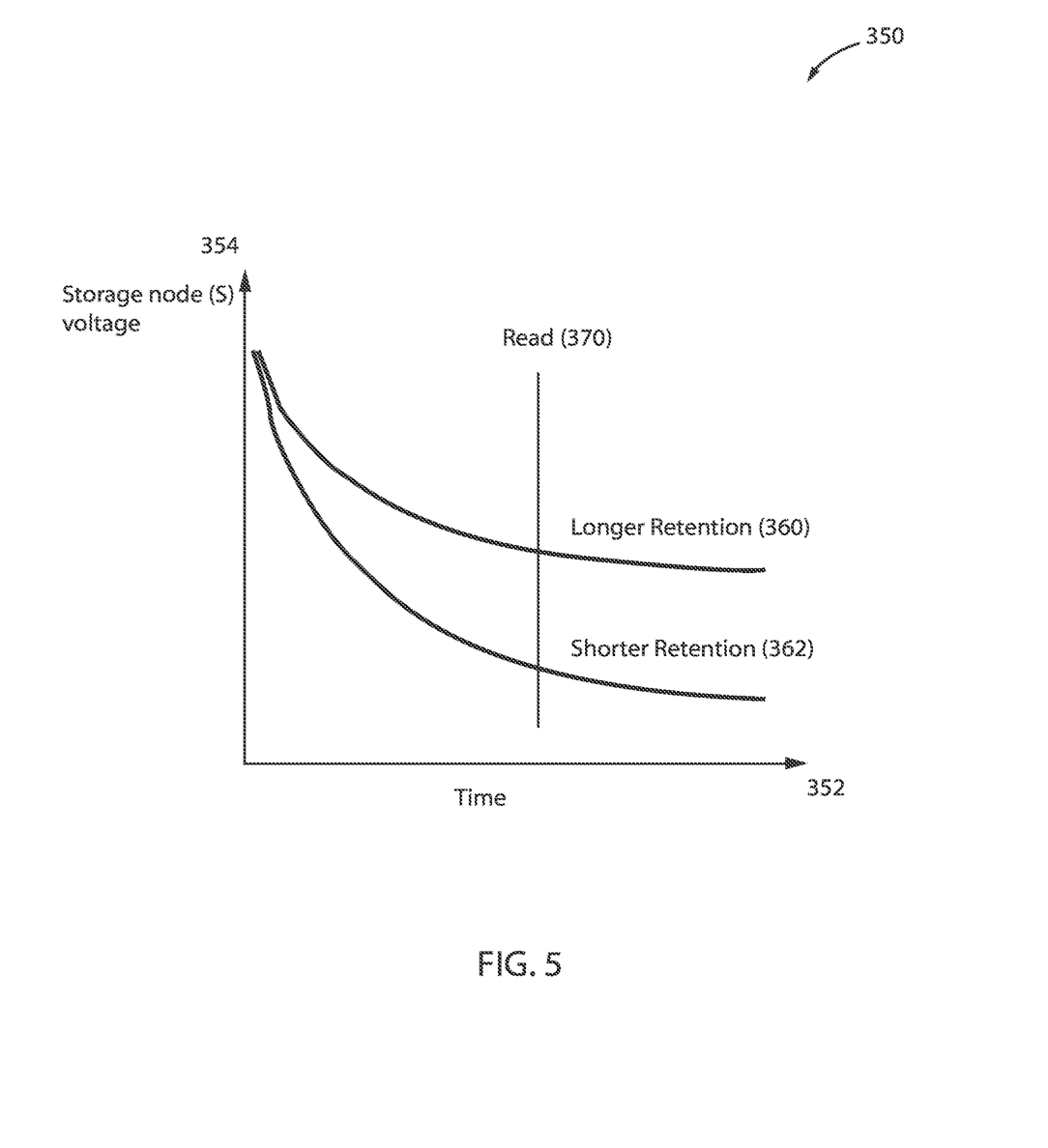
FIG. 5 illustrates a decay of storage node voltage of a gain cell of FIG. 1, in accordance with an embodiment of the present invention.

Therefore, as shown in FIG. 5, the read current depends on the retention time, as per graph 350, where the x-axis represents time 352 and the y-axis represents storage node voltage 354. FIG. 5 illustrates a decay of the storage node "S" voltage of a gain cell of FIG. 1 with a logic "1" of two gain cells, one with a longer retention time and the other with a shorter retention time due to the inherent process variability. For the gain cell with the longer retention time 360, after the gain cell is charged to High and after a given time period, the voltage at the node S (the gate of the read FET) remains High. As a result, a higher read current is present at the read BL. Conversely, for the gain cell with the shorter retention time 362, after the gain cell is charged to High and after a given time period, the voltage at the node S (the gate of the read FET) becomes lower than that of the gain cell with longer retention time. As a result, a lower read current presents at the read BL 370 of the gain cell with shorter retention time. Although FIG. 1 depicts 4 gain cells, the exemplary embodiments of the present invention are not limited to 4 gain cells. The exemplary embodiments can have other numbers of gain cells, for example, 100.

Figure 2:
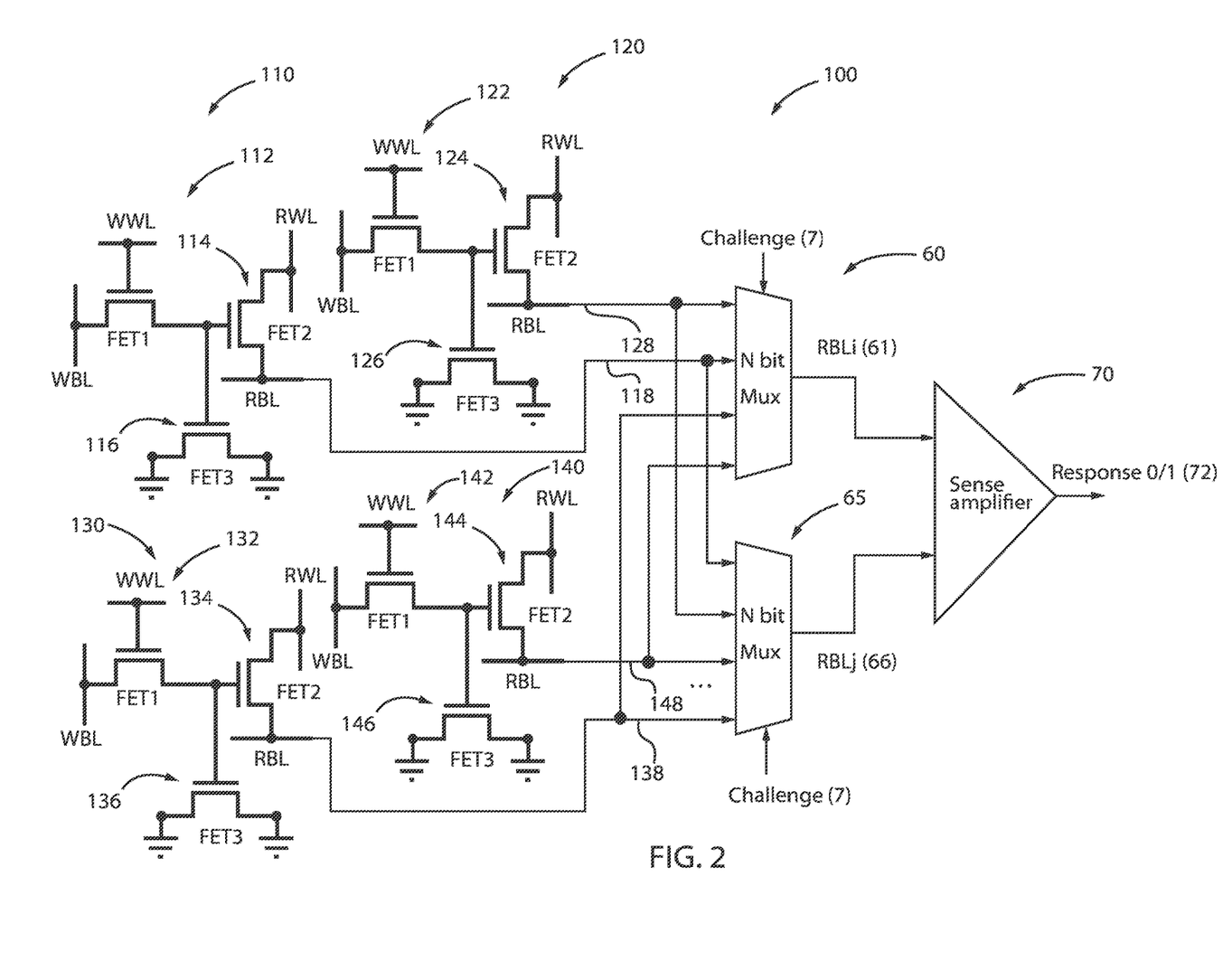
FIG. 2 is an exemplary structure for forming a physically unclonable function (PUF) by employing three-transistor gain cells, in accordance with an embodiment of the present invention.

FIG. 2 is an exemplary structure for forming a physically unclonable function (PUF) by employing three-transistor gain cells, in accordance with an embodiment of the present invention.

The gain cell PUF 100 depicts a first gain cell 110 and a second gain cell 120 connected to both a first analog multiplexer 60 and a second analog multiplexer 65. Thus, a pair of gain cells 110, 120 are connected to both the first and second multiplexers 60, 65. The gain PUF 100 further depicts a third gain cell 130 and a fourth gain cell 140 connected to both the first and second analog multiplexers 60, 65. Thus, a pair of gain cells 130, 140 are connected to both the first and second multiplexers 60, 65. As a result, a group of gain cells 110, 120, 130, 140 is connected to two analog multiplexers 60, 65. Each gain cell 110, 120, 130, 140 is a three-transistor (3T) gain cell. FET3 is used as a capacitor. The outputs of the multiplexers 60, 65 are provided to a sense amplifier 70, which can be, e.g., a current sense amplifier (SA).

The first gain cell 110 includes a first transistor 112, a second transistor 114, and a third transistor 116. The read bit line (RBL) 118 is connected to the first multiplexer 60.

The second gain cell 120 includes a first transistor 122, a second transistor 124, and a third transistor 126. The read bit line (RBL) 128 is connected to the first multiplexer 60.

The third gain cell 130 includes a first transistor 132, a second transistor 134, and a third transistor 136. The read bit line (RBL) 138 is connected to the second multiplexer 65.

The fourth gain cell 140 includes a first transistor 142, a second transistor 144, and a third transistor 146. The read bit line (RBL) 148 is connected to the second multiplexer 65.

The connection order of the gain cells to the input ports of each multiplexer can be different. For example, first multiplexer 60, from top to bottom, has input ports connections 120, 110, 130, 140. In contrast, the second multiplexer 65, from top to bottom, has input port connections 110, 120, 140, 130. Thus, the gain cells 110, 120, 130, 140 can be connected to each multiplexer 60, 65 in a different order. The output of each multiplexer 60, 65 depends on which port is selected. With such a configuration, when a same challenge 7 is applied to both multiplexers 60, 65, the output of each multiplexer will be different because of the different orders of connections of the gain cells 110, 120, 130, 140 to the input ports of the first and second multiplexers 60, 65.

As a result, paired gain cell groups are employed to simplify the process for reading out the PUF data. The exemplary embodiments of the present invention do not need the precise reading of each PUF cell. Instead, the relative retention times of a group of gain cells (e.g., pairs of gain cells) are used for reading the PUF data. In other words, the sensing mechanism involves using retention times of gain cells. The exemplary embodiments of the present invention thus employ gain cell memory to form the PUFs.

Due to the inherent manufacturing variation, the retention time of gain cells 110, 120, 130, 140 varies.

The signals of each pair of read bitlines (e.g., RBLi and RBLj) are compared by the current sense amplifier 70. If current (RBLi 61) is greater than the current (RBLj 66), then the current SA 70 outputs a logic "1". Otherwise, the current SA 70 outputs a logic "0." The output is designated as 72.

First, all gain cells 110, 120, 130, 140 are charged by turning both the write wordline (WWL) and the write bitline (WBL) to High. Then both WWL and WBL are turned off (Low). The read wordline (RWL) is then turned to High. Then wait for a given time period (e.g., 1 micron second).

A same challenge 7 is applied to both multiplexers 60, 65 as "Select" input to select a pair of gain cells. Due to the inherent variation of retention time of the gain cells, the electrical currents of the selected pair of read bitlines (e.g., RBLi and RBLi) are different. Similarly, due to the inherent variation of retention time of the gain cells, the electrical currents of the selected pair of read bitlines (e.g., RBLi and RBLi) are different. The currents are compared by the current SA 70.

If the current (RBLi 61) is greater than the current (RBLj 66), then the SA 70 outputs a logic "1." Otherwise, the SA 70 outputs a logic "0." This output is designated as 72.

Figure 3:
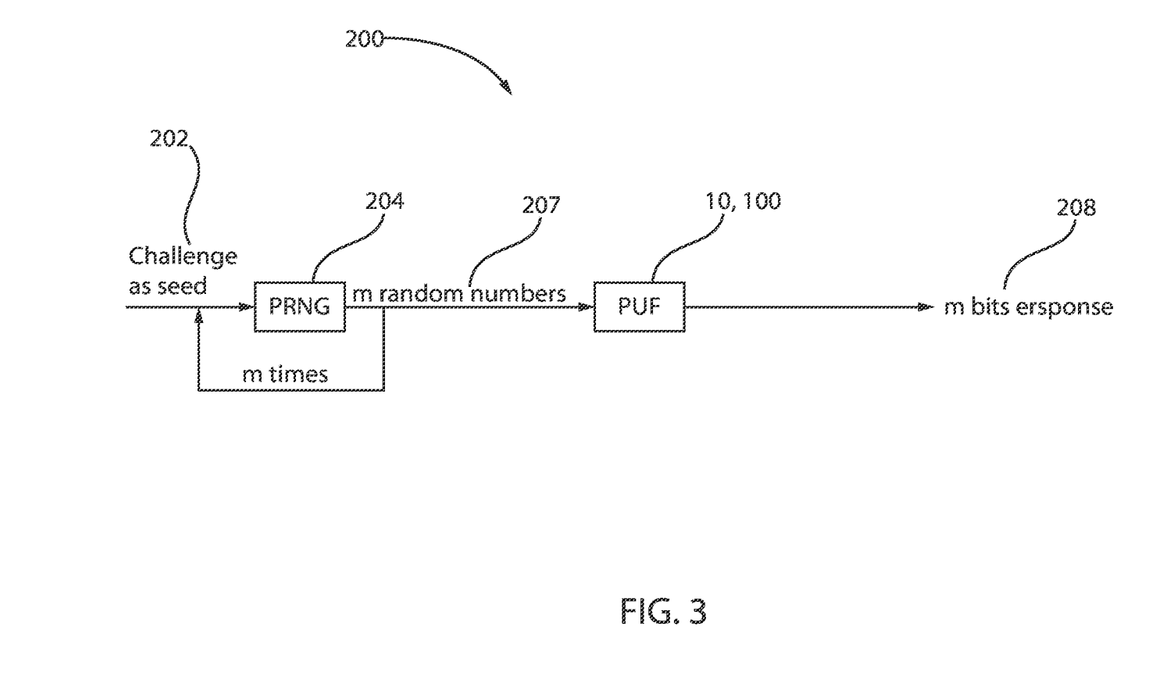
FIG. 3 is block/flow diagram of a first example method for producing an m-bit response from a 1-bit output of the PUF structure of FIGS. 1 and 2, in accordance with an embodiment of the present invention.

FIG. 3 is block/flow diagram of a first example method for producing an m-bit response from a 1-bit output of the PUF structure of FIGS. 1 and 2, in accordance with an embodiment of the present invention.

The PUF 10, 100 of the exemplary embodiments of the present invention produces a single bit response 72, that is, either a logic "0" or a logic "1." There are two ways to produce an m-bit response from the 1-bit output 72 of the PUF 10, 100 of the exemplary embodiments of the present invention.

Although FIG. 2 depicts 4 gain cells, the exemplary embodiments of the present invention are not limited to 4 gain cells. The exemplary embodiments can have other numbers of gain cells, for example, 100.

Figure 4:
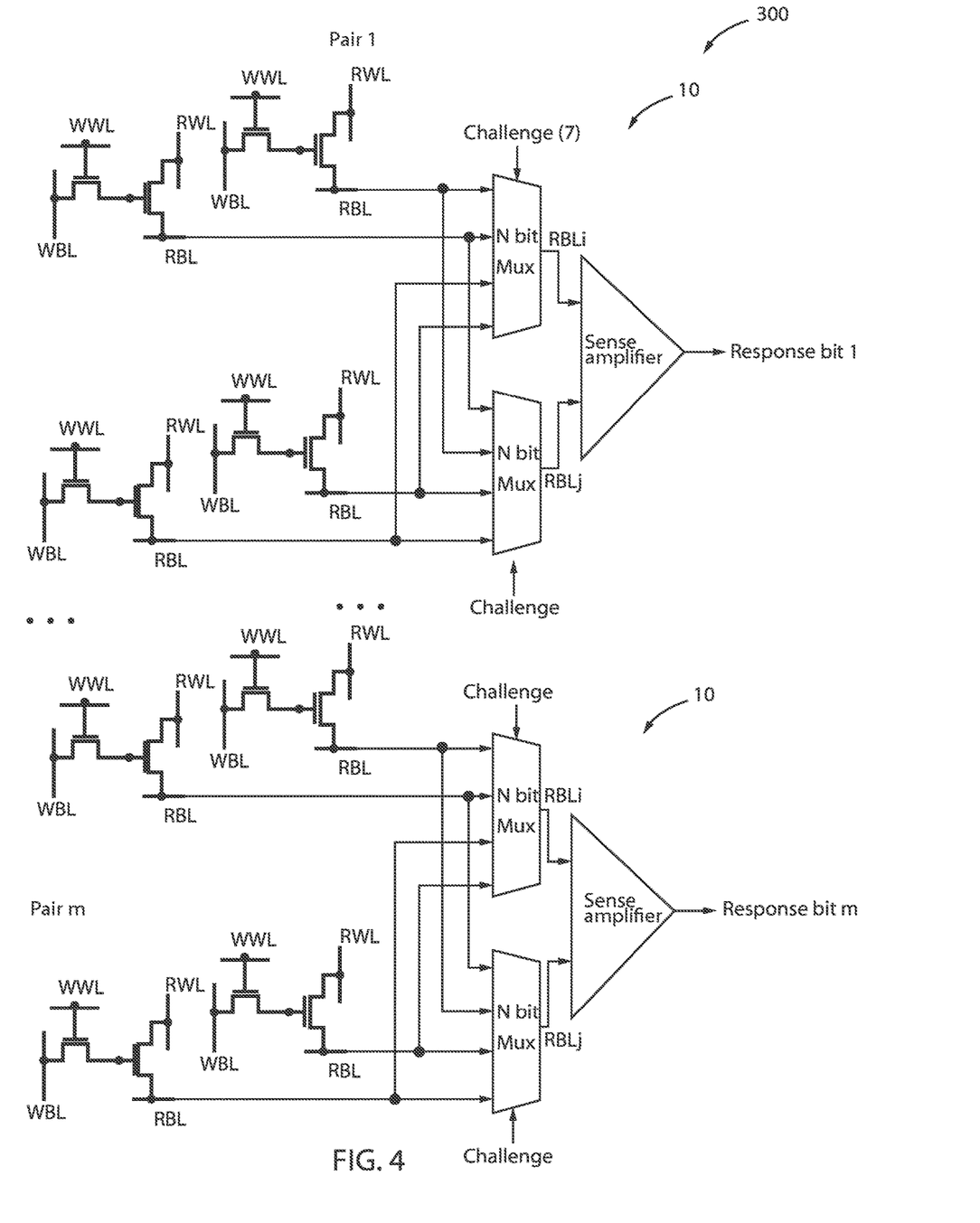
FIG. 4 is block/flow diagram of a second example method for producing an m-bit response from a 1-bit output of the PUF structure of FIG. 1, in accordance with an embodiment of the present invention.

FIG. 3 illustrates the first method and FIG. 4 illustrates the second method.

The first method involves using the PUF 10, 100 m times with a different input for each time. A challenge can be used as a seed for a pseudo-random number generator to generate m pseudo-random numbers as the inputs of the PUF 10, 100.

In particular, in system 200, a challenge can be used as a seed 202 for a pseudo-random number generator (PRNG) 204 to generate m pseudo-random numbers 207 as the inputs of the PUF 10, 100. Employing the generated m random numbers 207 as inputs to the PUF 10, 100 m times aids in obtaining m bits response 208.

FIG. 4 is block/flow diagram of a second example method for producing an m-bit response from a 1-bit output of the PUF structure of FIG. 1, in accordance with an embodiment of the present invention.

In system 300, the second method involves duplicating the PUF 10 m times to form a m-bit response PUF. A single challenge can be applied to all m PUFs. Each PUF produces a single bit and m bits can be obtained from m PUFs with a single challenge. Therefore, with reference to FIGS. 1-4, each comparison of a pair of gain cells generates one bit. Given N pairs of gain cells, there are N(N−1)/2 distinct pairs. However, the entropy of a PUF, is less than N(N−1)/2 because some bits obtained from pair-wise comparisons are correlated. For example, if gain cell A has a longer retention time than gain cell B, the comparison between gain cells A and B will result in a logic "1." If gain cell B has a longer retention time than gain cell C, the comparison between gain cells B and C will result in a logic "1." Clearly, a comparison between gain cells A and C will result in a logic "1" because these bits are correlated. Thus, there are N! different orderings of gain cells based on their retention times. Assuming the orderings are equally distributed, the entropy will be log 2 (N!) bits. In one example, 64 gain cells can produce 295 bits, 128 gain cells can produce 716 bits, and 512 gain cells can produce 3875 bits.

In summary, the exemplary embodiments of the present invention introduce a PUF including a group of gain cells connected to two multiplexers. The output of each multiplexer is connected to a sense amplifier (SA). A same challenge is applied to select inputs of the multiplexers. A response bit is generated at the output of the SA. Additionally, an array of gain cell PUFs can be employed to generate multiple bit responses. In another embodiment, a gain cell PUF in conjunction with a PRNG is employed to generate multiple bit responses.

Moreover, the exemplary embodiments of the present invention use a pair of outputs of two multiplexers with a group of gain cells as the inputs of the multiplexers to obtain the PUF. The outputs of each multiplexer connect to a sense amplifier. The absolute value of the retention time of each gain cell is not a concern. Also, the precise measurement of the retention time of each gain cell is not a concern.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As used herein, the terms "network connection," and "connection" refer to communication sessions with a semipermanent connection for interactive packet interchange between two or more communicating endpoints, such as network devices. The connection can be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) can deliver packets out of order, since different packets can be routed independently and could be delivered over different paths.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, and atomic layer deposition (ALD) among others.

Removal/etching is any process that removes material from the wafer. Examples include etch processes (either wet or dry), and chemical-mechanical planarization (CMP), and the like. Reactive ion etching (ME), for example, is a type of dry etching that uses chemically reactive plasma to remove a material, such as a masked pattern of semiconductor material, by exposing the material to a bombardment of ions that dislodge portions of the material from the exposed surface. The plasma is generated under low pressure (vacuum) by an electromagnetic field.

Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a gain cell memory based physically unclonable function (PUF) (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A physically unclonable function (PUF) structure comprising:
a plurality of gain cells each electrically connected to both a first multiplexer and a second multiplexer, all of the plurality of gain cells excluding oscillators; and
a current sense amplifier coupled directly to the first and second multiplexers to receive outputs therefrom without employing counters directly before or directly after the first and second multiplexers.

2. The PUF structure of claim 1, wherein each of the plurality of gain cells is a two-transistor gain cell memory.

3. The PUF structure of claim 1, wherein each of the plurality of gain cells is a three-transistor gain cell memory.

4. The PUF structure of claim 1, wherein a relative retention time of a group of gain cells including transistors is used for reading PUF data.

5. The PUF structure of claim 1, wherein read bitlines of transistors of the plurality of gain cells are directly connected to the first and second multiplexers.

6. The PUF structure of claim 5, wherein signals of the read bitlines of the plurality of gain cells are compared by the current sense amplifier.

7. The PUF structure of claim 1, wherein read bitlines of the plurality of gain cells are connected in a different order to input ports of the first and second multiplexers.

8. The PUF structure of claim 7, wherein, when a challenge is applied to both the first and second multiplexers, an output of each multiplexer is different.

9. The PUF structure of claim 8, wherein the output of each multiplexer is different as a result of the different order of the read bitlines connections of the plurality of gain cells to the input ports of the first and second multiplexers.

10. The PUF structure of claim 1, wherein a challenge can be used as a seed for a pseudo-random number generator to generate m pseudo-random numbers as inputs to the PUF structure.

11. A method for forming a physically unclonable function (PUF) structure, the method comprising:
electrically connecting each of a plurality of gain cells to both a first multiplexer and a second multiplexer, all of the plurality of gain cells excluding oscillators; and
coupling a current sense amplifier directly to the first and second multiplexers to receive outputs therefrom without employing counters directly before or directly after the first and second multiplexers.

12. The method of claim 11, wherein each of the plurality of gain cells is a two-transistor gain cell memory.

13. The method of claim 11, wherein each of the plurality of gain cells is a three-transistor gain cell memory.

14. The method of claim 11, wherein a relative retention time of a group of gain cells including transistors is used for reading PUF data.

15. The method of claim 11, wherein read bitlines of transistors of the plurality of gain cells are directly connected to the first and second multiplexers.

16. The method of claim 15, wherein signals of the read bitlines of the plurality of gain cells are compared by the current sense amplifier.

17. The method of claim 11, wherein read bitlines of the plurality of gain cells are connected in a different order to input ports of the first and second multiplexers.

18. The method of claim 17, wherein, when a challenge is applied to both the first and second multiplexers, an output of each multiplexer is different.

19. The method of claim 18, wherein the output of each multiplexer is different as a result of the different order of the read bitlines connections of the plurality of gain cells to the input ports of the first and second multiplexers.

20. A method for forming a physically unclonable function (PUF) structure, the method comprising:
electrically connecting each of a plurality of gain cells to both a first multiplexer and a second multiplexer, all of the plurality of gain cells excluding oscillators;
coupling a current sense amplifier directly to the first and second multiplexers to receive outputs therefrom without employing counters directly before or directly after the first and second multiplexers; and
using a relative retention time of a group of gain cells including transistors for reading PUF data.

* * * * *